Dec. 24, 1963  J. B. DICKSON  3,115,307
AUTOMOTIVE VEHICLE MARKER LAMP

Filed Feb. 23, 1961  4 Sheets-Sheet 1

INVENTORS
John B. Dickson
BY Blum, Moscovitz,
Friedman & Blum
ATTORNEYS

Dec. 24, 1963    J. B. DICKSON    3,115,307
AUTOMOTIVE VEHICLE MARKER LAMP
Filed Feb. 23, 1961    4 Sheets-Sheet 2

INVENTORS
John B. Dickson
BY Blum, Moscovitz,
Friedman & Blum
ATTORNEYS

Dec. 24, 1963  J. B. DICKSON  3,115,307
AUTOMOTIVE VEHICLE MARKER LAMP
Filed Feb. 23, 1961  4 Sheets-Sheet 3

INVENTORS
John B. Dickson
BY Blum, Moscovitz,
Friedman & Blum
ATTORNEYS

Dec. 24, 1963    J. B. DICKSON    3,115,307
AUTOMOTIVE VEHICLE MARKER LAMP
Filed Feb. 23, 1961    4 Sheets-Sheet 4
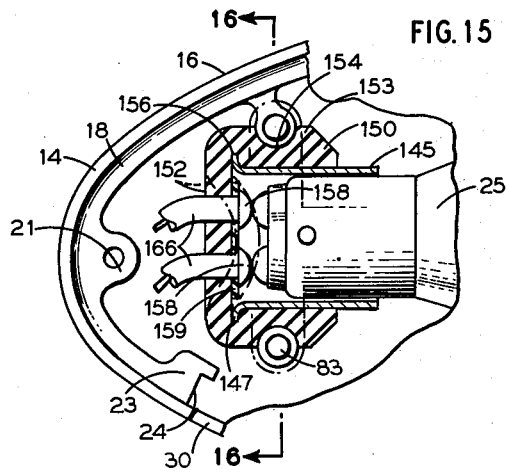
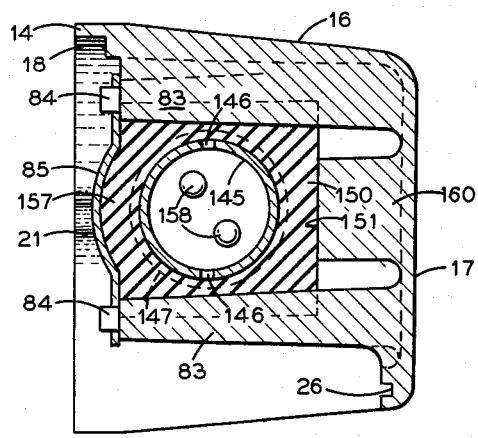
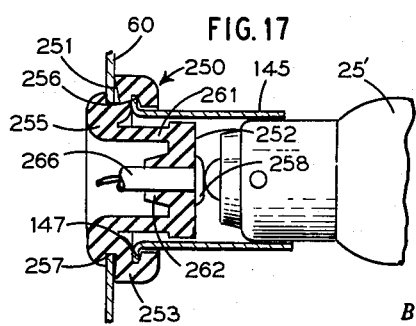
INVENTOR.
John B. Dickson
BY
Blum, Moscovitz,
Friedman & Blum
ATTORNEYS 3,115,307
AUTOMOTIVE VEHICLE MARKER LAMP
John B. Dickson, Kew Gardens, N.Y., assignor to Signal-
 Stat Corporation, Brooklyn, N.Y., a corporation of
 New York
Filed Feb. 23, 1961, Ser. No. 91,044
13 Claims. (Cl. 240—8.3)

This invention relates to automotive vehicle lamps, particularly for trucks, and more particularly to a novel combination signalling and tail lamp for automotive vehicles and which may be used as a turn signal, stop signal, tail or license plate lamp, and as a reflector, or as combinations of such lamps, all complying with the requirement of such lamps for commercial vehicles.

Automotive vehicles, and particularly commercial vehicles, such as trucks, trailers, busses and the like, are required by law or by Interstate Commerce Commission regulations to carry or be provided with certain specified lamps. For example, such vehicles must be equipped with the usual heal lamps, parking lamps and turn signal lamps on the front of the vehicle and, on the rear of the vehicle, there must be provided brake or stop lamps, tail lamps, and turn signal lamps, as well as a lamp or lamps for illuminating the license plate. In addition, regulations in most States require the vehicle to be equipped with reflectors, and these may be incorporated with the lenses of certain lamps, so as to reflect light from the head lamps of other vehicles. These various requirements necessitate that a large supply of special lamps for each purpose be kept on hand, and, in the case of operators of large truck fleets and bus fleets, this, in turn, requires a large inventory of different types of replacement lamps be kept available.

Automotive vehicles, and particularly commercial vehicles, are subjected to recurrent road shocks in travelling over the highway. These road shocks, transmitted through the frame of the vehicle, affect the relatively fragile filaments of the lamp bulbs in the marker, signalling and driving lamps of the vehicle, so that such bulbs break or become inoperative rather frequently due to the road shocks. Thus the lamp bulbs must be replaced at rather frequent intervals. With some types of lamps, such replacement is rather difficult for the driver of the vehicle to perform on the road. In addition, the driver is frequently unaware that the lamp bulbs on his vehicle have broken, or the lamps are inoperative, as his opportunity for observing the lamp condition occurs only when the vehicle is stopped, as at a rest area or during a change of drivers.

With the foregoing in mind, the present invention is directed to providing a novel lamp which may be used to perform any one, or a combination, of the several required functions of lamps on commercial auto vehicles, and in which the lamp bulb may be readily replaced by a driver rather than by a skilled mechanic. In addition, the lamp bulb socket and the lamp bulb are isolated, by novel shock isolating or shock mounting means, from road shock so that the life of a lamp bulb in the lamp of the present invention is several times that of a lamp bulb in a lamp not equipped with the novel shock mounting of the present invention.

The shock mounting means comprises a soft rubber cup embracing the usual bayonet type lamp socket, and a special feature of the invention is that the base of this cup has a formation which replaces, in function, the usual coil spring embracing the pigtail connection of the socket and which biases the socket contacts into engagement with the mating contacts on the base of the lamp.

As another feature, the lamp of the present invention is designed for numerous types of mountings, such as a single bolt mounting, a two-bolt mounting, and a mounting on a special mounting plate provided for ready adaptability to various mounting conditions. The lamp includes a main lens, which may be red, or sometimes yellow, and which is directed outwardly of the vehicle, and a second lens which is clear and is arranged to provide illumination for a license plate or other area of the vehicle to be illuminated. This clear lens is readily and easily slipped into and out of its seat in the housing, and is retained in position by the main lens. When the latter is secured in watertight relation to the lamp housing by a pair of easily removable screws, it also serves to lock the clear lens in its position.

Due to its universal mounting feature, plus the ready removal of the lenses for access, of an unrestricted nature, to the interior of the lamp housing for inspection and replacement of bulbs, the combination lamp of the invention forms a highly desirable unit for use on commercial vehicles and reduces greatly the inventory of lamps required to be kept on hand to maintain the lamp complement on such commercial vehicles. Also, maintenance expense is greatly reduced as the lamp bulb in the lamp may be replaced by an unskilled person, such as the driver of the truck or bus, without the use of any special tools.

For an understanding of the principles of the invention, reference is made to the following description of typical embodiments thereof as illustrated in the accompanying drawings. In the drawings:

FIG. 7 is an end elevational view of a clear lens incorporated in the lamp for illuminating a license plate or the like;

FIG. 15 is a partial elevational view of the lamp, illustrating a modified form of shock mounting means;

FIG. 16 is a view taken on the line 16—16 of FIG. 15; and

FIG. 17 is a view, similar to FIG. 13, illustrating a further modified form of shock mounting means.

Figure 1:
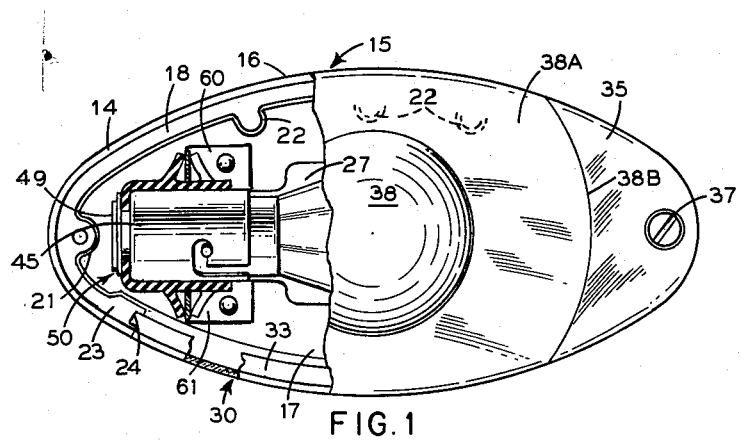
FIG. 1 is an outside elevational view of the lamp embodying the invention.
Figure 5:
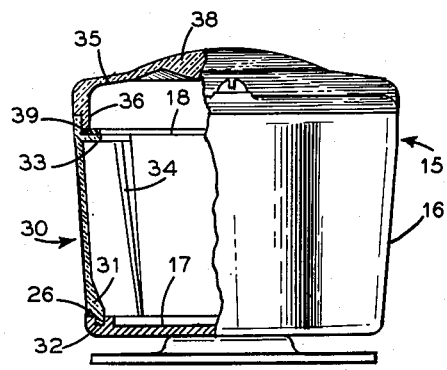
FIG. 5 is a side elevational view, partly in section, of the lamp.

Referring to the drawings, the lamp includes a housing 15, which may be a metal casting, and which includes a side wall 16 extending outwardly from a base 17. The housing is generally oval shaped in plan. Side wall 16 has its inner surface adjacent its upper edge formed to provide a seating surface or ledge 18 bounded by a relatively thin wall 19. Adjacent each end, side wall 16 is formed with generally cylindrical reinforcing ribs 21 which are threaded. Along one longer inner surface, the side wall 16 is formed with generally cylindrical reinforcing ribs or posts 22, there being three of these posts illustrated and the central one preferably extending somewhat above the surface 18 while the two outer posts terminate substantially flush with the surface 18. The opposite longer portion of side wall 16 is formed with an outwardly opening substantially rectangular recess 20 for a purpose to be described. Adjacent either end of recess 20, side wall 16 is thickened, as at 23, and the thickened portions 23 are formed with slots 24. A slot 26 extends along the periphery of base 17 at the inner edge of recess 20, as best seen in FIG. 5, and interconnects the two slots 24, of which one is shown in FIG. 1.

Figure 7:
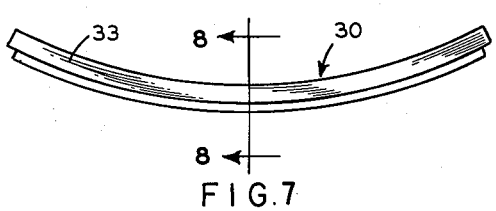
Figure 8:
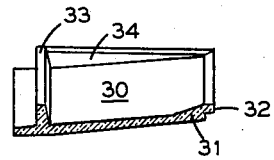
FIG. 8 is a sectional view taken on the line 8—8 of FIG. 7.

The recess 20 is arranged to be closed by a clear lens 30, of a suitable plastic material, shown more particularly in FIGS. 1, 2, and 4 through 8. Referring more particularly to FIGS. 7 and 8, clear lens 30 is curved longitudinally to conform to and complement the curvature of side wall 16 of housing 15. The lens has a general thickness approximating that of rim 19 around the upper edge of side wall 16. However, its lower edge is gradually thickened, as indicated at 31, and provided with an inwardly off-set rib 32 arranged to fit into the slot 26. At a distance from its upper edge corresponding to the height of rim 19, lens 30 is formed with an inwardly projecting shoulder or rib 33 which has a width slightly in excess of that of the seating surface or ledge 18 of side wall 16, and slightly less than that of the slots 24. Tapered ribs 34 extend downwardly from shoulder 33 to the lower edge of lens 30, these ribs converging or narrowing toward the lower edge of the lens and extending down from a portion of shoulder 33 which extends beyond the main body of lens 30. The ribs 34 have a wedge type fit in the slots 24, which are tapered in width correspondingly to the taper of the ribs 34. Thereby, lens 30 may be placed in position by merely sliding it downwardly with the ribs 34 engaging in the slots 24 until the ribs 32 engages in the slot 26.

The open end of housing 15 is closed by a colored lens 35 formed of a suitable light conducting material, and which may be either red, amber, or any other desired color. Lens 35 is generally oval shaped in plan and has its outer periphery arranged to be congruent with the outer periphery of the open end of housing 15. Just inwardly of its periphery, the lens 35 is formed with an oval rib 36 having a width substantially equal to that of the seating surface 18 of side wall 16 and a depth substantially equal to the height of rim 19. When lens 35 is seated on the outer edge of wall 16, it also engages the outer edge of lens 30 and overlies this outer edge. The lens 35 is secured in position by screws 37 extending through apertures at each end of the lens and threaded into the posts 21. Lens 35 thus maintains lens 30 in position.

It will be noted that the two lenses are easily removed for access to the interior of the lamp, by simply removing the screws 37 with an ordinary screwdriver, usually carried on most commercial vehicles, lifting lens 35, and then sliding out the lens 30. It may not be necessary, at all times, to remove the lens 30, unless it is desired to clean or replace the same. The lens 35 is characterized by a central bull's-eye 38, a surrounding portion of lesser convexity 38A which terminates substantially at line 38B and with a portion thereof outside line 38B being optically designed to reflect light impinging upon the exterior surface of the lens 35. A sealing gasket 39 is interposed between rib 36 of lens 35, seating ledge 18 of wall 16, and seating ledge 33 of lens 30 to form an effective watertight seal for the lamp.

A lamp bulb 25 is mounted in the lamp in such a manner that it is completely isolated from transmission thereto of any road shocks due to the motion of the vehicle, so that the filament of the lamp bulb will have an indefinitely long life as compared to the filaments of lamp bulbs in lamps not provided with such a shock mounting. Referring more particularly to FIGS. 1, 2, and 9 through 14, the shock mounting means comprises a soft rubber cup for the usual metal lamp socket, this cup being generally indicated at 50. Cup 50 is essentially similar to the cup 50 of the shock mounting shown, described, and claimed in the copending application of Donald S. Bruce et al., Serial No. 81,300, filed January 9, 1961, for "Cab Lamp for Automotive Vehicles." However, the mounting of the cup 50 differs in certain material respects from the corresponding mounting in said copending application.

Figure 11:
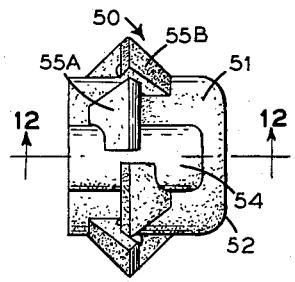
FIG. 11 is a side elevational view of the mounting cup.
Figure 10:
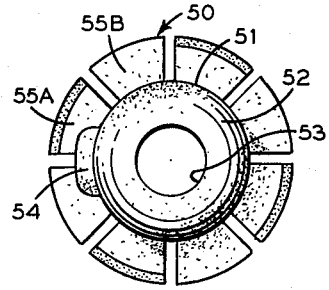
FIG. 10 is an end elevational view, taken from the opposite end, of the mounting cup.
Figure 12:
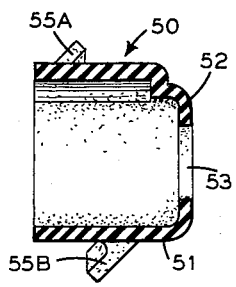
FIG. 12 is a sectional view taken on the line 12—12 of FIG. 11.
Figure 4:
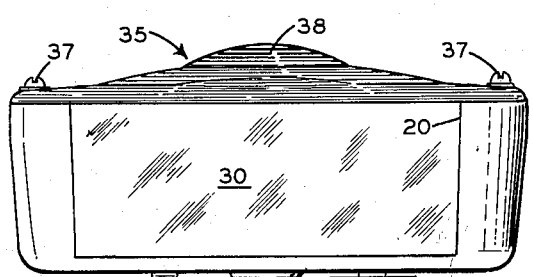
FIG. 4 is a view similar to FIG. 2 but illustrating a different mounting arrangement for the lamp.

Cup 50 includes a body portion 51 open at one end and having a partially closed opposite end 52 formed with a central aperture 53. As best seen in FIGS. 9 through 12 and 14, portion 51 is formed with a longitudinally extending off-set or hollow rib 54 for a purpose to be described. A plurality of truncated sector shaped fingers 55A and 55B project outwardly from the outer surface of portion 51, these fingers lying in planes which are at an angle to a transverse plane through the portion 51. The fingers are spaced slightly from each other peripherally of the mounting. Fingers 55A extend outwardly and toward end wall 52, whereas fingers 55B, alternating with fingers 55A, extend outwardly from about the general plane of wall 52 and angularly away from end wall 52 and toward the open end of the cup 50. It will be noted that the fingers 55A and 55B overlap each other, as best seen in FIG. 11, before the cup 50 is assembled with a cooperating mounting plate or bracket.

The lamp socket 45, having the usual bayonet slots 46, is seated within body portion 51 of the shock mounting cup 50 and has a reduced end 47 which extends through opening 53 and is spun over against a metal washer 48, as indicated at 49. Socket 45 also has a longitudinally extending slot 56 which, when the socket is assembled in cup 50, is aligned with the rib 54 of cup portion 51. The socket 45 is intended to receive a dual filament bulb 25 having two base contacts which engage two contacts 58 supported on the usual spring biased dielectric washer provided in automative lamp sockets. In order to assure proper orientation of bulb 25 in sockets 45, the slot 56 has a predetermined orientation relative to the bayonet slots 46, and the dielectric washer has a radial finger 57 which extends through slot 56, thereby properly aligning the two contacts 58 on the dielectric washer 59 with the two contacts of the base of the bulb 25.

Either before or after socket 45 is assembled in shock mounting cup 50, the cup 50 is assembled with a metal mounting bracket 60. This bracket is angular in form and has a relatively short leg 61 which is riveted or otherwise secured to the base 17 of housing 15, and a relatively long wall 62 extending at right angles to wall 61. Ribs 63 are off-set at the junction of legs 61 and 62 to reinforce the same. Longer leg 62 is formed with a preferably generally circular aperture 64 having at least a clearance fit with the body portion 51 of the shock mounting cup 50. When cup 50 is inserted through the opening 64, the fingers 55B will bend inwardly and the fingers 55A will bend toward the open end of the cup 50 until such time as the leg 62 clears the fingers 55B. At this time, the fingers 55A and 55B engage opposite sides of the leg 62. A conductor 65 is then soldered or brazed at one end to the bracket 60 and at the opposite end to the socket 45, to ground the socket to the bracket 60.

Shock mounting cup 50 is now supported solely by the highly flexible fingers 55A and 55B engaging arm 62 of bracket 61. Consequently, the shock mount 50 has an axial and a radial degree of freedom relative to the bracket 60, as well as an angular degree of freedom relative thereto, due to the cantilever effect of fingers 55A and 55B, whereby to absorb any shock transmitted to the bracket 60 from the vehicle. Conductors 66, connected to the contacts 58 of the dielectric washer 59, extend outwardly through the end of the socket 45 for connection into suitable circuits of the vehicle, after being led through appropriate openings in housing 15 as will be described hereinafter.

As stated, the housing 15 is arranged to be mounted in many different positions and by various means. Thus, the housing may be secured to a suitable mounting plate, may be mounted by means of a single hollow bolt extending centrally from its base 17, or may be mounted by means of a pair of mounting bolts extending from its base. The inner surface of base 17 is formed with a relatively elongated reinforcement 27 and, about at the mid-center of the base, a substantially square opening 28 is formed through this reinforcement and through the base 17, in such a manner as to receive a very short collar 28' which is square in plan. At the center of plate 40, the latter is formed with a tapered off-set 41 which is substantially rectangular in form, and which has a substantially rectangular opening 42 therein arranged to receive the afore-mentioned collar 28' and have the latter turned over to anchor plate 40 to housing 15.

At either side of off-set 41, plate 40 is formed with outwardly opening notches 43 arranged to receive bolts for anchoring the plate to a surface of the motor vehicle. Adjacent each end, plate 40 is formed with substantially rectangular notches 44 having lateral off-sets, also arranged to receive bolts for anchoring plate 40 to a surface of a motor vehicle.

Figure 2:
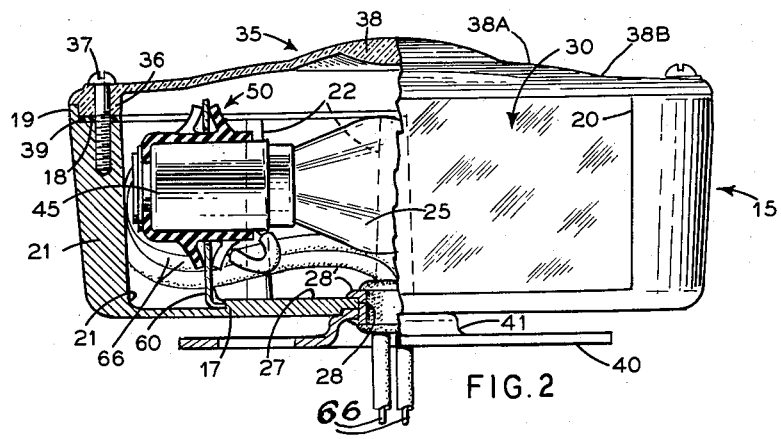
FIG. 2 is a bottom plan view of the lamp as it would appear when mounted on a motor vehicle on the rear end thereof.
Figure 3:
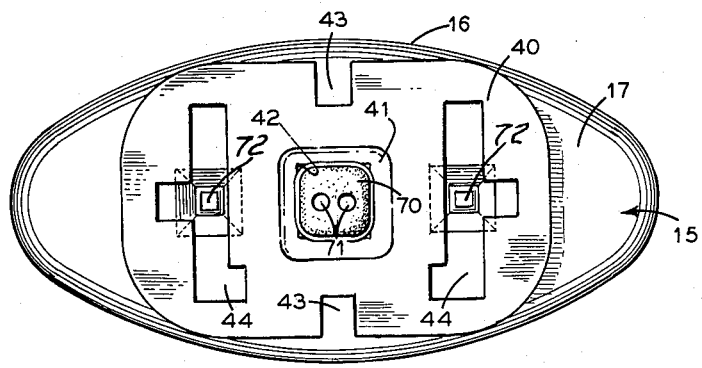
FIG. 3 is an elevational view of the mounting end of the lamp, showing a mounting plate.
Figure 9:
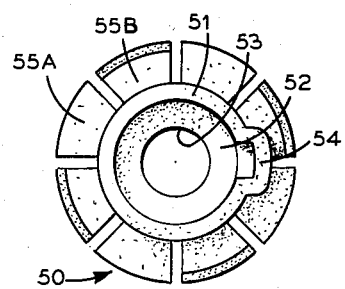
FIG. 9 is an open end elevational view of a shock isolating mounting cup for the lamp bulb.

In the arrangement shown in FIGS. 1, 2 and 3, a sealing bushing 70, having a square central section and provided with flanges at either end, is inserted through opening 42 so that its flanges engage over both ends of collar 28'. This sealing bushing has a pair of apertures 71 through which the conductors 66 are lead out of the housing 15 for connection into the control circuit.

Referring to FIG. 3, it will be noted that the base 17 of housing 15 is provided with a pair of square knock-outs 72 each substantially at the center of a slot 44. By removing the knockouts 72, a pair of bolts 75, having square portions adjacent their heads, may be inserted through the resulting openings and provided with plain washers 73, lock washers 74, and nuts 76 for mounting the lamp on a vehicle as indicated in the arrangement shown in FIG. 4. In this case, the conductors 66 are again brought out through the openings 71 in the bushing or grommet 70.

Figure 6:
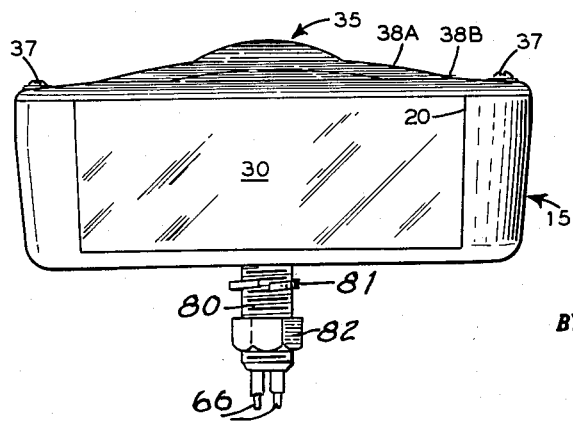
FIG. 6 is a view similar to FIGS. 2 and 4 but illustrating a further mounting arrangement for the lamp.

The lamp may also be mounted on the vehicle by means of a single hollow bolt 80 as shown in FIG. 6. In this case, the grommet 70 is removed and the hollow bolt 80 has its square shank portion, adjacent its head, swaged into the opening 28. Hollow bolt 80 is provided with a lock washer 81 and a nut 82, and conductors 66 are brought out through the bolt. It will thus be noted that the lamp may be mounted on a truck utilizing any one of a plurality of different mounting arrangements.

FIGS. 15, 16, and 17 show shock mountings in which the soft rubber cup shaped member performs, additionally, the function of the usual contact biasing spring associated with the pigtail connections to a bayonet type lamp socket. In these constructions, not only is the lamp bulb isolated from shocks transmitted by the vehicle, but also the socket construction is greatly simplified, as the coil springs usually disposed around the pigtail connections between the contact and the inside of the base of the socket are eliminated and the pigtails are merely brought through the base of the rubber cup, this base being so formed as to perform the same function performed by the usual coil springs.

Referring first to the arrangement shown in FIGS. 15 and 16, in this embodiment of the invention a pair of tapered posts 83 extend outwardly from the base 17 of the lamp 15, and between these posts there is a relatively narrow upstanding wall 160 corresponding to the bracket 60 of the embodiments of the invention previously described. The posts 83 have tubular or hollow extensions 84 for a purpose to be described.

The shock mounting is in the form of a cup 150 of soft rubber, and having a side wall 153 which is formed with a pair of diametrically opposite arcuate cross-section recesses 154 arranged to conformingly engage the tapered posts 83. Referring to FIG. 16, in elevation, the cup 150 is substantially rectangular, including a substantially flat side 151 engaging the partition or wall 160, and has a cylindrical recess for receiving the socket member 145. The outer wall of member 150 is arched intermediate its ends, as indicated at 157, and a strap 85 conformingly fits this wall and has apertured ends fitting over the extensions 84 which are then spun down over the ends of the strap 85 to anchor the shock isolating cup 150 in position.

The socket 145 is a tubular metal element, not having any base. Adjacent its inner end, the tubular metal element 145 has an out turned flange 147 which fits in a groove 156 adjacent the base 152 of the soft rubber cup member 150. Tubular element 145 is further formed with the usual bayonet slots 146 for receiving the orienting pins on the base of lamp bulb 25.

Referring more particularly to FIG. 15, it will be observed that the central portion of base 152 is normally arched to extend considerably inwardly of the tubular member 145. In the particular embodiment shown, this base is pierced to receive conductors 166 provided with contacts 158 which rest against the inner surface of base 152. A dielectric washer 159 is interposed between contacts 158 and base 152. When the lamp bulb 25 is engaged in the socket 145, the base 152 of the cup member 150 is pushed outwardly to a substantially flat position, biasing the contacts 158 to engage the contacts on the base of bulb 25. This base 152 thus serves the function of the usual coil spring biasing the contacts 158 to engage the lamp contacts, as in the usual bayonet lamp socket. The soft rubber cup 150 also thoroughly isolates the lamp bulb 25 from any shocks transmitted by the vehicle.

Figure 13:
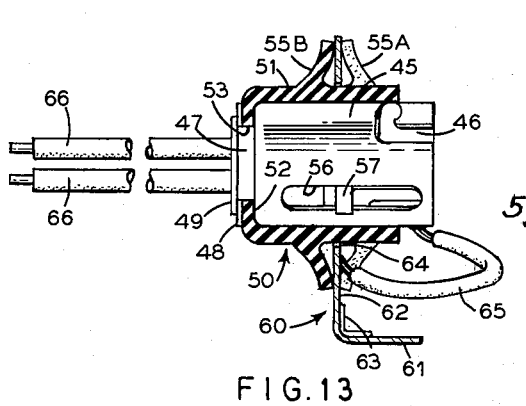
FIG. 13 is a side elevational view, partly in axial section, through the shock isolating mounting of the lamp bulb.
Figure 14:
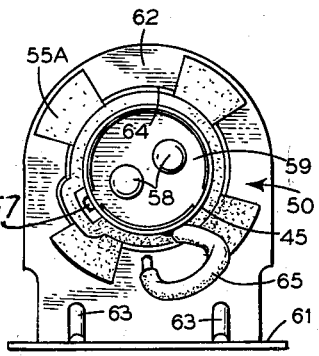
FIG. 14 is an end elevational view looking to the right at FIG. 13.

Referring to FIG. 17, the soft rubber shock mounting cup 250 shown therein is arranged to be used with a bracket such as the bracket 60 of FIGS. 13 and 14, and to shock isolate a metal lamp socket 145 which is substantially identical with the socket 145 of FIGS. 15 and 16. For this purpose, the side wall 253 of the rubber cup 250 is formed with an annular recess 256 arranged to seat the peripheral flange 147 at the inner end of tubular socket 145.

Side wall 253 is substantially shorter than the side wall 153 of the cup 150 of FIGS. 15 and 16, and has a radial surface 251 seating against the bracket 60. An extension 255 of the cup projects beyond bracket 60 and cooperates with surface 251 to form a recess 257 arranged to receive the bracket 60. The base 252 of the cup 250 is at the end of a re-entrant tubular extension 261 extending axially from the extension 255, and base 252 has a reversely directed apertured central enlargement 262 which receives the contact 258 and the pigtail 266. In other words, the base 252 is re-entrant in the cup 250 and projects beyond the "open" end thereof by virtue of the tubular extension 261. When the lamp bulb 25', shown in this case as a single contact lamp bulb, is engaged in the socket 145, the contact on the inner end of the lamp base engages the contact 258 and presses the base 252 toward the "bottom" end of the cup 250. The re-entrant tubular extension 261 and the base 252 thus conjointly perform the function of the usual coil spring in maintaining the contact 258 in firm engagement with the single contact on the base of lamp 25'. Additionally, the rubber cup 250 effectively isolates the lamp 25' from all shocks transmitted to the bracket 60 by the vehicle.

While specific embodiments of the invention have been shown and described in detail to illustrate the application of the principles of the invention, it will be understood that the invention may be embodied otherwise without departing from such principles.

What is claimed is:

1. A combination signal and tail lamp, for automotive vehicles, comprising, in combination, a housing including a relatively elongated base and a peripheral side wall extending outwardly from said base and defining on opening; said side wall being formed with a seating ledge in its outer edge; a relatively elongated polygonal outwardly opening notch in said side wall along one longer side of said lamp and having closure engaging formations along its edges; a first lens arranged to close said notch in complementary relation to said side wall, and having edge configurations engaging said formations; the outer edge of said closure being formed with a seating ledge in continuation of that in the outer edge of said side wall; a lens closing said opening and having a peripheral formation, conforming to said seating ledges; means disengageably securing said lens to said housing; said lens retaining said closure in said notch; and means for mounting a lamp bulb in said housing.

2. A combination signal and tail lamp, for automotive vehicles, comprising, in combination, a housing including a relatively elongated base and a peripheral side wall extending outwardly from said base and defining an opening; said side wall being formed with a seating ledge in its outer edge; a relatively elongated polygonal outwardly opening notch in said side wall along one longer side of said lamp and having lens engaging formations along its edges; a first lens arranged to close said notch in complementary relation to said side wall, and having edge configurations engaging said formations; the outer edge of said first lens being formed with a seating ledge in continuation of that in the outer edge of said side wall; a second lens closing said opening and having a peripheral formation, conforming to said seating ledges; means disengageably securing said second lens to said housing; said second lens retaining said first lens in said notch; and means for mounting a lamp bulb in said housing.

3. A combination signal and tail lamp, for automotive vehicles, as claimed in claim 2, in which said first lens is a substantially clear lens, and said second lens is colored.

4. A combination signal and tail lamp, for automotive vehicles, as claimed in claim 2, including a sealing gasket seated along said seating ledges; the peripheral formation of said second lens seating against said gasket.

5. A combination signal and tail lamp, for automotive vehicles, comprising, in combination, a housing including a relatively elongated base and a peripheral side wall extending outwardly from said base and defining an opening; said side wall being formed with a seating ledge in its outer edge; a relatively elongated polygonal outwardly opening notch in said side wall along one longer side of said lamp and having closure engaging formations along its edges; a closure arranged to close said notch in complementary relation to said side wall, and having edge configurations engaging said formations; the outer edge of said closure being formed with a seating ledge in continuation of that in the outer edge of said side wall; a lens closing said opening and having a peripheral formation conforming to said seating ledges; means disengageably securing said lens to said housing; said lens retaining said closure in said notch; a lamp bulb socket; a generally cup-shaped member of resilient soft material having a body portion embracing said socket; and a bracket secured to said base and having an arm extending outwardly therefrom and formed with an aperture receiving said body portion; said cup-shaped member having cantilever means extending from said body portion engaged with opposite surfaces of said arm to support said socket with axial, radial and angular degrees of freedom of movement relative to said bracket, whereby said lamp bulb socket and a lamp bulb secured therein are isolated from shocks transmitted by the vehicle on which said lamp is mounted.

6. A combination signal and tail lamp for automotive vehicles, as claimed in claim 5, including a conductor connecting said socket to said bracket.

7. A combination signal and tail lamp, for automotive vehicles, comprising, in combination, a housing including a relatively elongated base and a peripheral side wall extending outwardly from said base and defining an opening; said side wall being formed with a seating ledge in its inner surface adjacent its outer edge; a relatively elongated substantially rectangular outwardly opening notch in said side wall along one longer side of said lamp and having lens engaging formations along its edges; a first lens arranged to close said notch in complementary relation to said side wall, and having edge configurations engaging said formations; said first lens having a lip extending from its inner surface in parallel spaced relation to its outer edge and constituting a seating ledge in continuation of that in the inner surface of said side wall; a second lens closing said opening and having a periphery substantially congruent to the periphery of said opening, said second lens having a rib extending parallel to and spaced inwardly from its periphery, said rib extending toward said seating ledges; means disengageably securing said second lens to said housing; said second lens retaining said first lens in said notch; and means for mounting a lamp bulb in said housing.

8. A combination signal and tail lamp, for automotive vehicles, as claimed in claim 7 including a gasket seated on said seating ledges; the rib of said second lens firmly engaging said gasket to form a water-tight seal therewith.

9. A combination signal and tail lamp, for automotive vehicles, as claimed in claim 7 in which said lens engaging formations comprise slots, and said edge configurations comprise ribs engageable in said slots.

10. A combination signal and tail lamp, for automotive vehicles, as claimed in claim 1, in which said base is formed with a central polygonal aperture arranged to have interchangeably anchored therein either a grommet formed with aperture means for the lamp conductor means or a hollow shank mounting bolt for the lamp having the lamp conductor means passing therethrough.

11. A combination signal and tail lamp, for automotive vehicles, as claimed in claim 10 including a mounting plate having a central aperture congruent with that in said base; a hollow polygonal rivet extending through the aperture in said base and the aperture in said mounting plate and anchoring said mounting plate to said base, against turning movement relative to said base; and a grommet anchored within said rivet and formed with aperture means for passage of the lamp conductor means.

12. A combination signal and tail lamp, for automotive vehicles, as claimed in claim 10 in which said base is formed with a pair of polygonal knock-outs symmetrically disposed in spaced relation to said central aperture and designed for the anchoring of a pair of mounting bots to said base.

13. A combination signal and tail lamp, for automotive vehicles, as claimed in claim 5 in which said cup has a longitudinally extending outwardly offset hollow rib in a side wall; said socket having a longitudinally extending slot in its side wall alignable with said hollow rib; and a contact supporting plate within said socket having a finger projecting from its periphery through said slot and into said hollow rib to align the contacts carried thereby with a specific orientation relative to said socket.

References Cited in the file of this patent

UNITED STATES PATENTS

| | | |
|---|---|---|
| 1,795,940 | Falge | Mar. 10, 1931 |
| 2,001,472 | Sauer | May 14, 1935 |
| 2,099,444 | Langdon | Nov. 16, 1937 |
| 2,208,154 | Daehler | July 16, 1940 |
| 2,686,868 | Diedring | Aug. 17, 1954 |
| 2,860,233 | Johnson | Nov. 11, 1958 |
| 2,866,082 | Clayton et al. | Dec. 23, 1958 |